(12) United States Patent
Nelson

(10) Patent No.: US 8,021,085 B1
(45) Date of Patent: Sep. 20, 2011

(54) ENGRAVING TOOL WITH A VERY STRONG CUTTER TIP TO REDUCE BREAKAGE

(76) Inventor: Lance Nelson, Hudson, MA (US)

(*) Notice: Subject to any disclaimer, the term of this patent is extended or adjusted under 35 U.S.C. 154(b) by 439 days.

(21) Appl. No.: 11/710,451

(22) Filed: Feb. 23, 2007

(51) Int. Cl.
*B23C 5/12* (2006.01)

(52) U.S. Cl. .............. 407/54; 407/65; 407/62; 409/234

(58) Field of Classification Search ............... 407/33, 407/53, 54, 62, 65; 409/125, 234
See application file for complete search history.

(56) References Cited

U.S. PATENT DOCUMENTS

| | | | |
|---|---|---|---|
| 371,387 A * | 10/1887 | Smith | |
| 476,817 A * | 6/1892 | Pratt | 407/54 |
| 938,434 A * | 10/1909 | Pierpoint | 407/57 |
| 2,317,615 A * | 4/1943 | Johnson | |
| 2,334,845 A * | 11/1943 | Schwartz | |
| 2,367,841 A | 1/1945 | Monroe | |
| 2,442,554 A * | 6/1948 | Swiatek | |
| 2,525,828 A * | 10/1950 | Rice | 407/54 |
| 2,529,143 A * | 11/1950 | Eriksson | |
| 2,795,979 A * | 6/1957 | Zerwick | |
| 2,829,543 A * | 4/1958 | Bergstrom | |
| 3,022,686 A * | 2/1962 | Rowley | |
| 3,076,356 A * | 2/1963 | Simich | |
| 3,288,015 A * | 11/1966 | Hanneman | 411/387.4 |
| 3,395,603 A * | 8/1968 | Skierski | 411/387.8 |
| 3,444,766 A * | 5/1969 | Eriksson | |
| 3,463,045 A * | 8/1969 | Prescott | 411/387.8 |
| 3,564,948 A * | 2/1971 | Pomernacki | 408/211 |
| 3,645,641 A * | 2/1972 | Kim | |
| 3,836,278 A * | 9/1974 | McInnes | |
| 4,032,251 A * | 6/1977 | Ribich | |
| 4,147,088 A * | 4/1979 | Whittaker, Jr. | 411/387.8 |
| 4,295,768 A * | 10/1981 | Skierski | 411/387.8 |
| 4,338,050 A * | 7/1982 | Ozer et al. | 408/1 R |
| 4,448,120 A | 5/1984 | Richardson | |
| 4,449,865 A * | 5/1984 | Yankovoy et al. | 408/1 R |
| 4,470,733 A * | 9/1984 | Marques, Jr. | 408/230 |
| 4,599,024 A * | 7/1986 | Sano et al. | 411/387.8 |
| 4,708,557 A * | 11/1987 | Hashimoto | 411/387.8 |
| 5,149,234 A * | 9/1992 | Durfee, Jr. | 408/211 |
| 5,209,612 A * | 5/1993 | Kish | 407/54 |
| 5,308,286 A * | 5/1994 | Uejima | 470/9 |
| 5,452,971 A * | 9/1995 | Nevills | 408/230 |
| 5,971,670 A | 10/1999 | Pantzar et al. | |
| 6,095,723 A | 8/2000 | Reynolds et al. | |
| 6,312,432 B1 * | 11/2001 | Leppelmeier | 606/80 |
| 6,315,505 B1 * | 11/2001 | Moore | 408/199 |
| 2003/0059263 A1 | 3/2003 | Chen | |
| 2006/0045639 A1 * | 3/2006 | Flynn et al. | 407/54 |

* cited by examiner

*Primary Examiner* — Boyer D Ashley
*Assistant Examiner* — Sara Addisu
(74) *Attorney, Agent, or Firm* — Robert Nathans

(57) ABSTRACT

A conical shaped engraving tool has a tip configuration for increased strength that is especially desirable when engraving stainless steel. The improved conical tip consists of a thin V or U shaped slot or channel that touches the central axis of the tool and provides the cutting edge while leaving the maximum amount of material on the tip of the tool for maximum tool strength. A back angle is rotated 90 degrees to the cutting edge so that cutting forces are directed along the cutting edge instead of just on a point for further increasing the tip strength to prevent it from breaking. Also the thin slot is tilted on a slight angle away from a central axis thereby creating a downward force on the cutting edge of the tool when the tool is rotated, which results in pushing burrs into the cut creating an engraved line with better appearance.

10 Claims, 6 Drawing Sheets

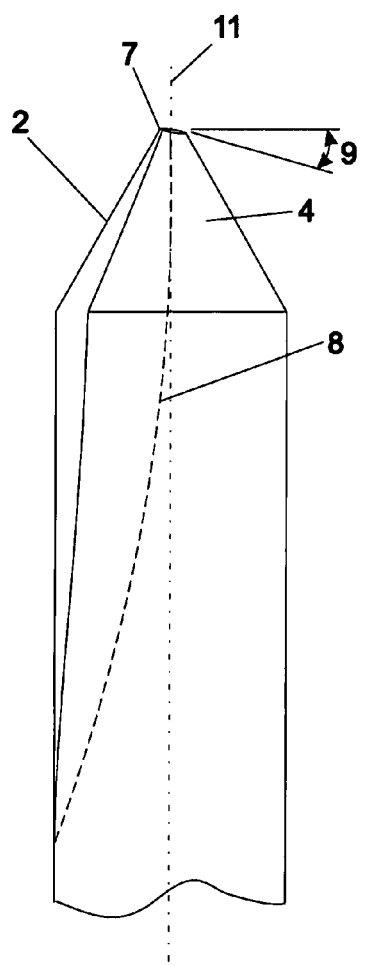 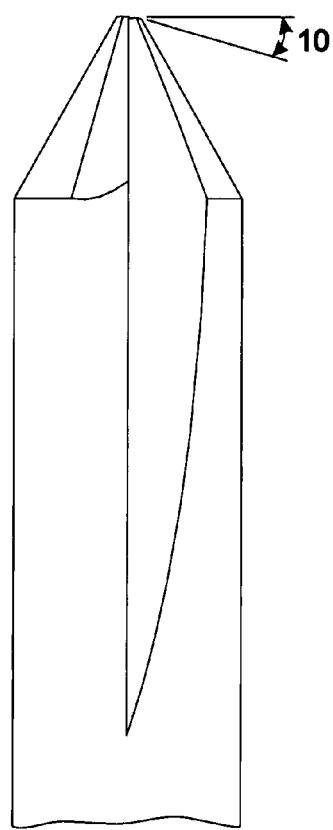 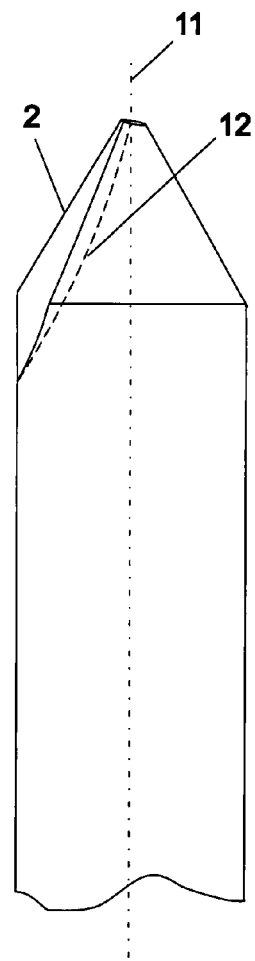
FIG.3   FIG.4   FIG.5
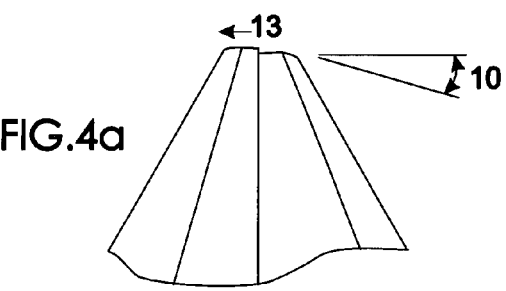
FIG.4a

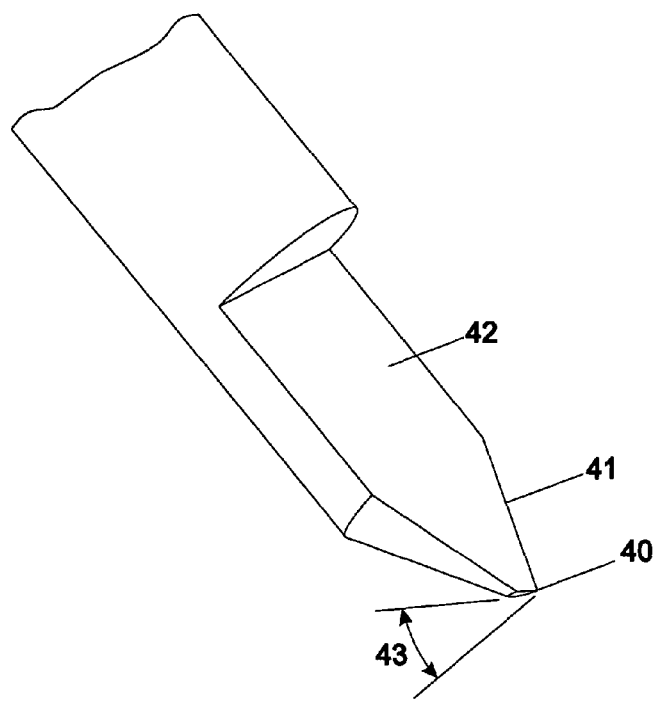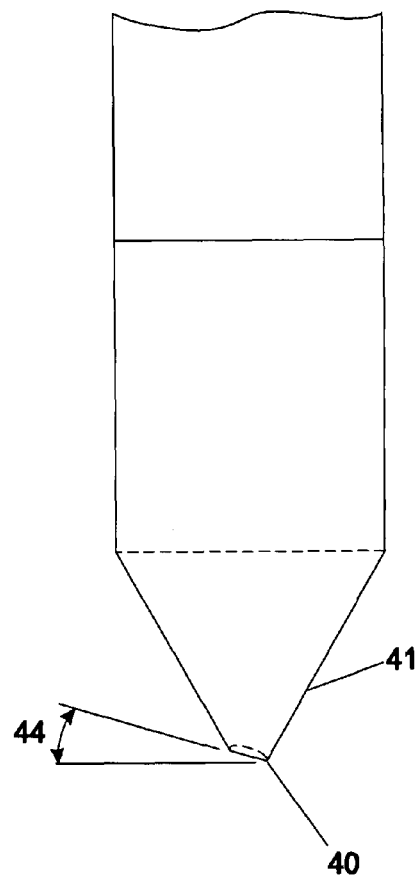
FIG.8
PRIOR ART
FIG.9
PRIOR ART

ENGRAVING TOOL WITH A VERY STRONG CUTTER TIP TO REDUCE BREAKAGE

BACKGROUND OF THE INVENTION

The present invention relates to the field of conical shaped cutting tools for the engraving and cnc machining industry.

Though many different shaped cutting tools are available that are capable of engraving or milling a thin line in a variety of materials, the most popular and effective cutting tool for producing thin lines is a half split conical shaped engraving tool with a single cutting edge. This tool is considered the "standard" in the engraving industry.

The standard conical shaped engraving tool that is used for engraving fine lines in material such as aluminum or stainless steel is typically created by splitting the end of the engraving tool in half with a grinding wheel, grinding the cone shape on the end of the tool, putting a relief on the cutting edge and then grinding a small angled flat tip on the end to generate the desired tip width which will create the engraved line. This tool is very effective at producing a clean engraved line in most materials. An example of this tool can be seen in FIG. 6 of Grenier U.S. Pat. No. 5,397,204 and in FIG. 8 of this application.

The production of the standard conical shaped engraving tool involves removing half of the material from the end of the tool which considerably weakens the tool tip. When engraving softer materials such as plastic or aluminum, this tool configuration is acceptable. When attempting to cut harder materials such as stainless steel, titanium or tough aerospace materials, the tips have a tendency to break off which renders the cutting tool useless and forces the user to replace the tool.

Tool designs other than the standard conical shaped engraving tool are available for cutting tougher materials but are not much more effective.

One tool that is often sold to engrave stainless steel is known as a quarter round engraving tool. This is simply a standard conical shaped engraving tool with a second split perpendicular to the first split. This has the effect of removing three quarters of the material from the tip of the tool. Although the tool has much greater clearance for the cut metal chips to be evacuated from the cut, which aids in reducing burrs on the surface of the material being engraved, the tip is very prone to breakage as is expected.

Antares, Inc. (Horsham, Pa.) developed a tool marketed as the Spiralflute® engraving tool. This is a conical shaped engraving tool which uses a right handed spiral drill like flute for the cutting edge instead of simply splitting the tool entirely in half. Since the tool has a cone shape, it is necessary for the flute to be ground all the way to the center axis of the tool so there is a cutting edge located on the tip. If the flute is not ground all the way to the center, there will not be any cutting edge located on the tip of the tool. The helical shaped cutting edge provides for a marginally stronger cutting edge than the standard conical shaped engraving tool but the tip of the tool still breaks off due to the fact that approximately half of the tool material is still being removed during grinding.

A pyramid shaped cutter can be seen in FIG. 8 of Richardson U.S. Pat. No. 4,448,120. This pyramid tool simply has multiple facets ground to a point on the end of the tool. There is no relief on the backside of the cutting edges so the tool doesn't actually cut or scoop any material from the workpiece while it is cutting but instead pushes a burr up during the cut. This burr is undesirable and produces a jagged looking line. Since there are no actual cutting edges on this tool, it has a tendency to chip easily and the tips break off.

Other tool designs are available that could be used for engraving. For example, Pantzar U.S. Pat. No. 5,971,670 describes a standard ball nose shaped endmill. Although this tool may be used to engrave a line, since the end of the tool has a full radius and is not conical shaped, as the tool is plunged deeper into the material, the width of the line increases very rapidly. If an extremely small diameter tool is used to attempt to engrave a fine line, the tools break very quickly because there are two opposing flutes cut into the tool and the diameter of the remaining material at the tip is very small. Cutting two flutes into the end of the tool removes a large amount of material from the very tip of the tool and weakens the tip making it prone to breakage.

Reynolds U.S. Pat. No. 6,095,723 describes another multiple fluted engraving tool. Reynolds invention's primary concern is that the tool should have two opposing flutes so the tool has two cutting edges instead of one like a standard half split engraving tool. Having two cutting edges allows operating the tool at a faster feedrate since the chipload on the cutting edge will be shared among the two flutes. However, looking at FIG. 3 of the Reynolds patent, it is obvious that a significant amount of the material has been removed from the tip of the tool and will therefore not be a strong tip design. It can also be seen from the same figure that with multiple fluted tools, the very tip of the tool comes to a sharp point where the two opposing flutes meet at the tip. This small point has almost zero material at the very tip where the multiple flutes meet. Additionally, when the tip of the tool comes to a point on the central rotating axis of the tool, the rotating surface speed of the tool at the tip is essentially equal to zero. For example, as the tool rotates around, the areas of the cutting edge that are located on the outer diameter are moving at a faster surface speed than the areas closer to the central axis. As you move closer to the center of the rotating axis, the surface speed is slower and when you reach the center of the tool it is essentially zero. Since the surface speed at the center is zero, there is no cutting action going on at the tip of the tool and there is a large amount of pressure applied to the tip as it is pushed through the material being engraved. This will quickly lead to tip failure of the tool.

Chen (Pub. No. US 2003/0059263) describes a multiple fluted tool similar to Reynolds. This tool is identical in configuration to standard chamfer tools that have been on the market for many years. The tool simply has multiple flutes cut to the tip of the tool. Chen describes shaping the overall end of the tool with different radii to produce machined lines that have different shapes at the bottom of the machined surface. Chen pays no attention whatsoever to the actual configuration of the tip. As with Reynolds, as the multiple flutes are cut to the tip of the tool, the opposing flutes meet at the tip on center and remove a large amount of material from the tip of the tool. Removing such a large amount of material from the tip of the tool significantly weakens the tip of the tool. Since the flutes are cut to the center of the tool, the very tip of the tool has a surface speed of zero as it rotates. As with Reynolds, this will provide for very poor cutting action at the tip and will apply a large amount of force to the tip. This will lead to breakage of the tip of the tool.

The present invention addresses this problem of tip breakage with a new unique design that removes a minimal amount of material from the tool tip which significantly increases the strength of the tool tip and overall life of the tool when cutting tougher materials such as stainless steel.

SUMMARY OF PREFERRED EMBODIMENTS OF THE INVENTION

The objectives set forth above are met in accordance with the present invention, whereby a conical shaped cutting tool is created by removing a minimal amount of material from the tool tip. Instead of splitting the tool in half, a thin V shaped slot is ground into the end of the tool so it touches the tip of the cone at the center.

Then, in a manner similar to the standard conical engraving tool, a relief is placed on the cutting edge. This relief angle can be varied depending on the material to be engraved. Steeper relief angles create a sharper cutting edge and create a cleaner cut but will weaken the tool if it creates too sharp of an edge. When the relief angle is placed on the tool, clearance is also created on the back side of the tool by rotating it on the grinding wheel which has the effect of removing material from the back side of the tool. This clearance allows for room for the chips that are created during the cutting process to be expelled from the cut. Without the clearance, the tool would rub against the material being cut, would generate heat, and would lead to tool failure.

A tip is then placed onto the end of the pointed cone. This tip can be produced in various widths to create different width engraved lines. The typical configuration of a tip is a compound angle on the end of the cone. There is an angle in relationship to the cutting edge and there is an angle on the back side of the tip for clearance.

Although a tip can be created that has a typical configuration, as stated above, an additional feature of the invention is to actually put a rotated and reversed angle on the backside of the tool (the tip clearance angle). This rotated and reversed angle has the effect of adding more material to the tool tip and placing the cutting force on the side of the point instead of just on the single point as in the prior art. It also causes the tool tip to slightly rub as it spins around and creates a burnishing or polishing like effect on the bottom of the cut surface. Through actual testing, it has been determined that this reverse angle is much more robust and does not break as easily as the standard tip configuration.

The tools would typically be constructed of cemented tungsten carbide rod or high speed steel but other harder materials such as polycrystalline diamond could also be used as they become more available.

BRIEF DESCRIPTION OF THE DRAWINGS

These and other features and advantages of the present invention will be better understood by reading the following detailed description, taken together with the drawings wherein:

FIG. 3 is a partial perspective view detailing the tip of the tool;

FIG. 4 is a similar view as FIG. 3 but rotated 90 degrees;

FIG. 4a is an exploded partial view detailing the tip of the tool shown in FIG. 4;

FIG. 5 is a view similar to FIG. 3 but shows an alternative design that has even less material removed from the V shaped slot;

FIG. 8 illustrates a standard prior art conical half split engraving tool design;

FIG. 9 is a two dimensional frontal view of the standard prior art conical half split engraving tool design;

DETAILED DESCRIPTION OF THE PREFERRED EMBODIMENTS OF THE INVENTION

Figure 1:
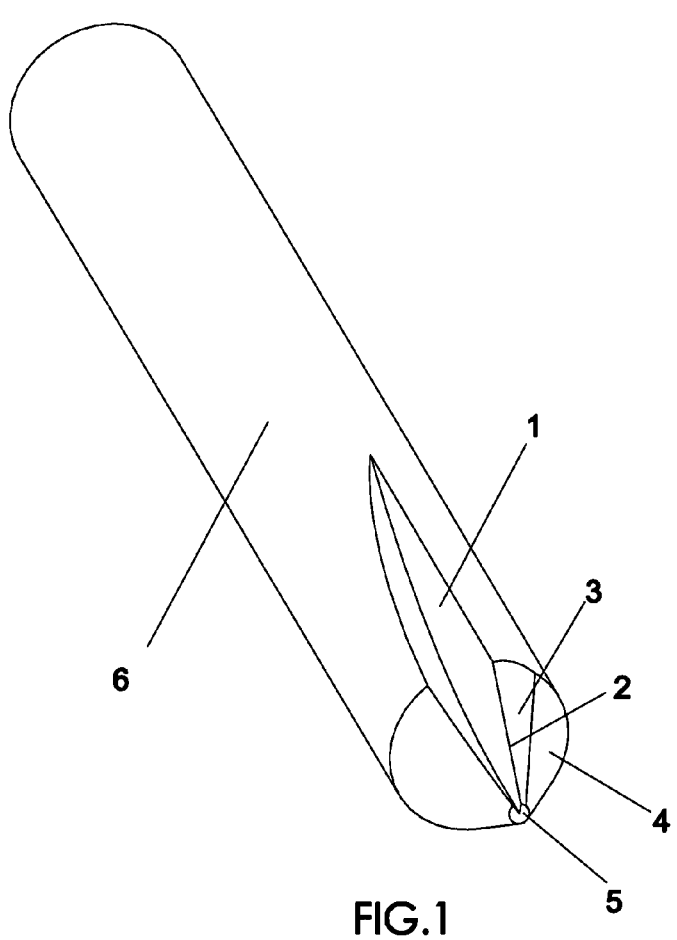
FIGS. 1 and 2 are perspective views of the disclosed overall design of the invention.

The material the tool is constructed from may be carbide (usually a grade of cemented tungsten carbide) although other typical tool making materials may be used such as high speed steel or polycrystalline diamond. The tool is typically manufactured with a grinding machine using diamond impregnated grinding wheels with various shaped wheels although newer technologies exist such as electrical erosion machines which could also be used to produce the tool.

Referring to FIGS. 8 and 9, the prior art standard conical shaped half split engraving tool is split in half 42 down the center of the tool. A cone is ground around the tip of the tool creating a cutting edge 41. A tip 40 is ground onto the end of the tool which has both a side angle 44 and a back angle 43. Since it is common for the width of the tip to be on the order of 0.005"-0.010", putting a side angle 44 and back angle 43 on the tool tip creates a very small sharp point 40 which contains only a small amount of material for strength. Since there is very little material located on the tip of the tool, when the tool is plunged into a tough material to be engraved, the tip fractures and breaks off rendering the tool useless. Once the tool breaks, it needs to be replaced because the quality of the engraved line becomes unacceptable. The side angle and back angle which are ground on the tip of the tool place an angled end onto the tip which removes the problem of having zero surface speed exactly at the tip.

Figure 2:
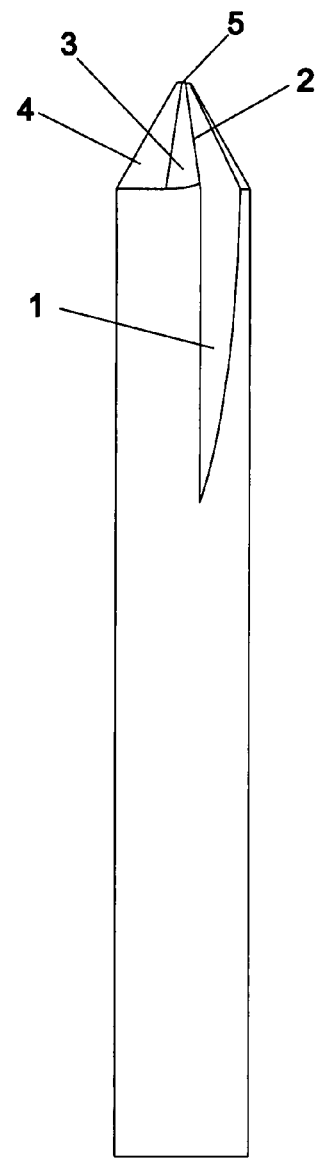

FIGS. 1 and 2 illustrates the new tool design which has a thin V shaped groove 1 cut into the shaft 6 of the tool. As stated above, this is typically accomplished via a grinding machine using diamond impregnated grinding wheels. A relief 3 is then ground onto the end of the tool which creates a sharp cutting edge 2 which is at an angle in relationship to the V shaped groove 1. The tool is then rotated about its central axis on the grinding wheel which creates a conical shape 4 on the end of the tool. A tip 5 is then ground onto the end of the tool.

The reason for placing a V shaped slot 1 in the end of the tool instead of splitting the tool in half as shown in FIG. 8 is to reduce the amount of material being removed from the tip of the tool. Retaining the maximum amount of material near the tip significantly strengthens the tool tip and allows it to last much longer.

Figure 6:
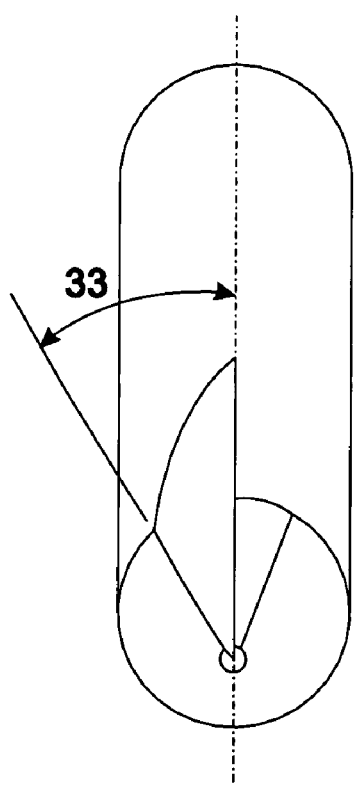
FIG. 6 is a perspective view describing the angle of the V shaped slot.

The V shaped slot 1 is typically produced with an angled grinding wheel which is pushed straight into the end of the tool shaft. From FIG. 6 it can be seen that this creates a V slot with an angle 33 defined by the particular grinding wheel used. From simple testing, it has been observed that creating an angle 33 that is less than 90 degrees is significantly beneficial in providing tip strength versus the prior art half split engraving tool. Ideally, a smaller angle 33 is desired, but creating too sharp an angle requires a grinding wheel with a very keen edge. The keen edge of this grinding wheel breaks down quickly and causes manufacturing problems. It has been found that creating an angle 33 that is approximately 45 degrees or 30 degrees generates an extremely strong tip and also makes for a tool which is easy to manufacture.

In practice, the tool is used by rotating it in the spindle of a cnc engraving or milling machine and plunging into the material to be engraved. The depth of engraving is typically on the order of 0.010". Sometimes the depth of engraving is less than 0.010" but usually is not deeper than 0.050". Therefore the area of the tool that is in contact with the workpiece during engraving is only the conical part of the tool. So it is not necessary to have the V shaped groove go very far up the shaft of the tool on the center axis 11. It is only important that there be a cutting edge 2 on the conical section of the tool 4. To retain the maximum strength of the tool, it is not necessary that the bottom of the V shape meet the center axis 11 of the shaft at any place other than at the tip of the tool. FIG. 5 shows the V shaped slot 12 touching the center axis 11 at the tip of the cone only. FIG. 3 shows the V shaped slot 8 cut further up the center axis 11 which removes a larger amount of material from the shaft of the tool. It is necessary though that the V shaped groove is cut to the center axis 11 of the tool at the tip. If it is not cut to the center axis of the tool at the tip, there will not be a cutting edge located on the tip. When compared with the prior art of splitting the tool in half, either the tool in FIG. 3 or FIG. 5 have greatly improved tip strength and overall tool strength.

As in the prior art, it is desirable to place a wider tip on the end of the tool. Simply adding a 0.005" wide area on the tip of the tool greatly improves the tip strength versus a perfectly sharp point. Wider width tips are desirable for creating wider engraved line widths and also provide more tip strength than smaller width tips. The prior art has a side angle 44 tilted so the cutting edge of the tip 40 is the lowest point of the tool (on the outer periphery) and contacts the workpiece first as it is plunged in to the workpiece. As the tool rotates around in the spindle of the cnc machine, the tip 40 clears material as it spins. If there is no side angle 44 then the entire bottom of the tool touches as it spins. This rubbing action creates heat and causes the tool tip to break. With no side angle, there would be material at the center of the rotating tool which would have a surface speed of zero. There is also a back angle 43 on the tool tip. Similarly as the tool rotates, the back angle creates clearance for the material when it is cut. Without the back angle, the tool tip rubs and leads to failure.

Although it is certainly feasible to place a tip on the new tool design that has a side angle and a back angle similar to the prior art side angle 44 and back angle 43, a slightly different tip design is further described which adds even more strength to the tip.

FIG. 3 displays a side angle 9 which is identical in direction to the prior art's side angle 44. Instead of a standard back angle 43 as in FIG. 8, the newly disclosed tip has a back angle 10 rotated 90 degrees to the cutting edge. As can be seen in FIG. 4a, rotating the back angle 90 degrees from the cutting edge causes the cutting forces 13 to be directed along the rotating edge instead of just on a point like in the prior art. The angle is also reversed compared with the prior art. This has the effect of placing an almost horizontal line directly behind the point of the tool. This directs the cutting forces 13 along more of a line instead of just against a small point. This significantly increases the strength of the tip.

Figure 7:
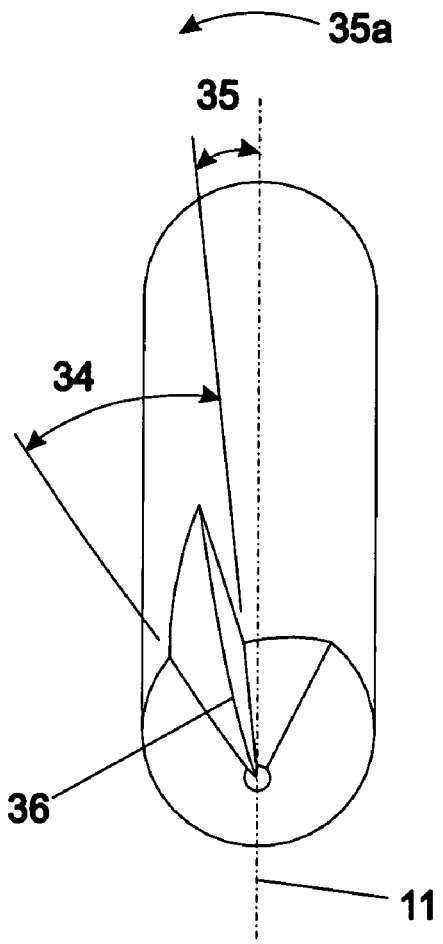
FIG. 7 is a perspective view of an alternate design with a tilted V shaped slot.

An alternate design is shown in FIG. 7. When the tool is used in practice, if the cutting edge of the tool is not absolutely sharp, it may have a tendency to create burrs on the surface of the material being engraved. Certain materials such as stainless steel are more prone to creating burrs. As shown in FIG. 7, the thin V shaped slot 36 is tilted on a slight angle 35 from the central axis 11. The shaft rotation direction is indicated by arrow 35a, and is preferably rotated clockwise so that the slight angle 35 is tilted in a direction similar to the rotational direction of the shaft. This creates a downward force on the cutting edge when the tool is rotated. This downward force will have a tendency to push the burrs down into the cut instead of pulling the burrs up onto the surface of the material being engraved. This creates an engraved line with a better appearance than a line with a burr protruding up from the surface of the material.

The angle of the tilted slot in FIG. 7 is opposite to the angle used for most traditional cutting tools. For example standard twist drills used for drilling holes have a right hand cut and a right hand helical flute. This right handed flute pulls chips up and away from the workpiece surface. As stated above, having the angled V shaped slot tilted so it pushes the burrs down into the slot creates a better looking line with fewer burrs on the surface.

It is possible to tilt the V shaped slot in a direction similar to standard tools for certain materials that are extremely gummy and tend to create very large surface burrs which would be too large to push down into the engraved line.

Figure 10:
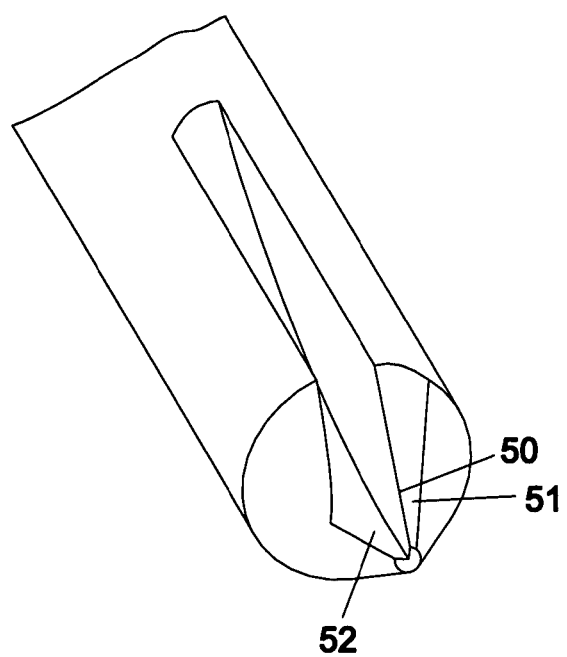
FIG. 10 is a partial perspective view of an alternate design with a U shaped slot.
Figure 11:
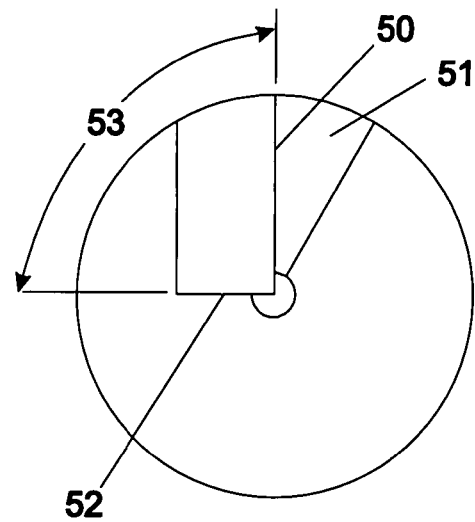
FIG. 11 is an end view of FIG. 9 looking down the U shaped slot.

FIGS. 10 and 11 show an alternative method of producing a thin slot in the shaft of the tool. Instead of using an angled V shaped wheel to create a V shaped slot, a simple thin straight grinding wheel can be used to generate the slot. If a straight grinding wheel is used, a U shaped slot 52 is formed in the shaft. As can be seen in FIG. 10 the formed U shaped slot 52 has the effect of removing one quarter of the material from the tip of the tool. Although this is better than the prior art half split engraving tool, it is not quite as strong of a tip as the described version with a thin V shape slot. However, this may be an easier product to manufacture than the V shaped slot because the grinding wheels used to produce this shape last longer than the V shaped grinding wheels.

Figure 12:
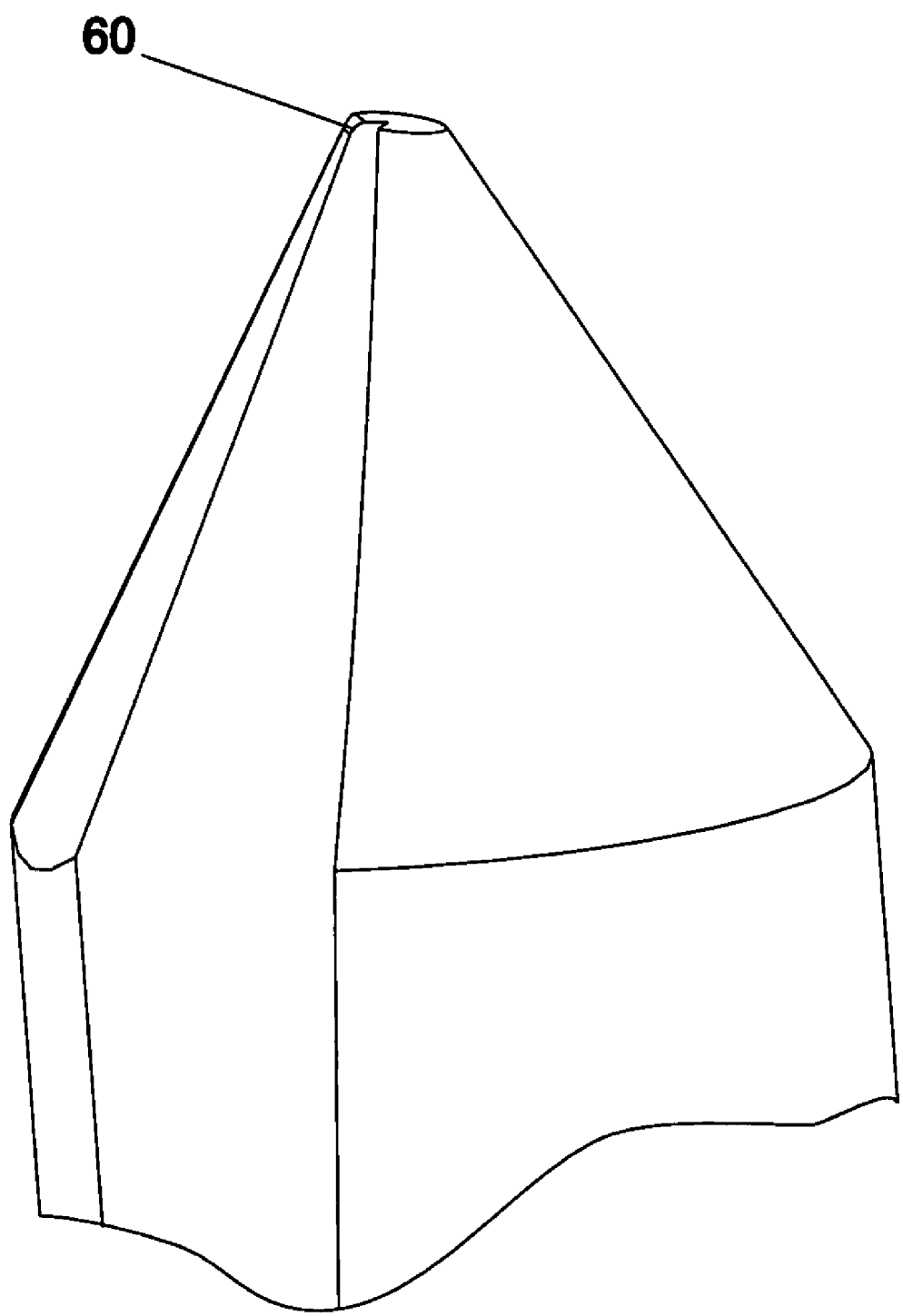
FIG. 12 is a partial perspective view of an alternate design with a radius on the end of the cutting edge where it meets the tip.

An alternate design is shown in FIG. 12. A small radius or edge break 60 may be added to the end of the cutting edge where it meets the tip of the tool. This small radius effectively removes the point that is created when the small flat is placed on the tip and will further increase the strength of the tip where it meets the cutting edge.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as defined by the appended claims.

What is claimed is:

1. A rotary engraving tool comprising:
   (a) a cylindrical shaft having a conical end portion terminating in a tip portion positioned at a central axis about which the shaft rotates in a given rotational direction;
   (b) a single thin slot formed in said conical end portion and touching said tip portion said single thin slot having a relief to form a cutting edge; and
   (c) wherein said tip portion has a side angle which places the lowest part of the tip portion on the outer periphery of its cutting edge; and
   (d) wherein said tip portion also has a back angle formed into the end of said tip portion; and
   (e) wherein said back angle is rotated 90 degrees to the cutting edge so that cutting forces are directed along the cutting edge instead of just on a point.

2. The tool of claim 1 wherein said single thin slot has an angle between sides thereof of between 20 and 60 degrees.

3. The tool of claim 2 where said thin slot is U or V shaped and wherein said angle is about 30 or about 45 degrees to facilitate use of common grinding wheels for forming said thin slot.

4. A rotary engraving tool comprising:
a) a cylindrical shaft having a conical end portion terminating in a tip portion positioned at a central axis about which the shaft rotates in a given rotational direction;
(b) a single thin slot formed in said conical end portion and touching said tip portion said single thin slot having a relief to form a cutting edge; and
(c) wherein said tip portion has a side angle which places the lowest part of the tip portion on the outer periphery of its cutting edge; and
(d) wherein said tip portion includes a radius or edge break where it meets the cutting edge.

5. A rotary engraving tool comprising:
(a) a cylindrical shaft having a conical end portion terminating in a tip portion positioned at a central axis about which the shaft rotates in a given rotational direction;
(b) a single thin slot formed in said conical end portion touching said tip portion and having a relief area to form a cutting edge; and
(c) and wherein said single thin slot removes less than one quarter of the material of said conical portion; and
(d) wherein said single thin slot is tilted on a slight angle away from a central axis running through the length of said cylindrical shaft; and
(e) wherein said tip portion includes a radius or edge break where it meets the cutting edge.

6. The tool of claim 5 whereby said slight angle is tilted in a direction similar to the rotational direction of said shaft whereby a downward force on the cutting edge of said tool is created when the tool is rotated.

7. The tool of claim 5 wherein said single thin slot has an angle between sides thereof of between 20 and 60 degrees.

8. The tool of claim 7 where said thin slot is U or V shaped and wherein said angle is about 30 or about 45 degrees to facilitate use of common grinding wheels for forming said thin slot.

9. A rotary engraving tool comprising:
(a) a cylindrical shaft having a conical end portion terminating in a tip portion positioned at a central axis about which the shaft rotates in a given rotational direction; and
(b) a single channel formed in said conical end portion and touching said tip portion said single channel having a relief area to form a cutting edge; and
(c) wherein said single channel removes less than one quarter of the material of said conical end portion; and
d) wherein a back angle is formed at said tip portion that is rotated 90 degrees with respect to the cutting edge so that cutting forces are directed along the cutting edge instead of just on a point.

10. A rotary engraving tool comprising:
(a) a cylindrical shaft having a conical end portion terminating in a tip portion positioned at a central axis about which the shaft rotates in a given rotational direction; and
(b) a single channel formed in said conical end portion and touching said tip portion said single channel having a relief area to form a cutting edge; and
(c) wherein said single channel removes less than one quarter of the material of said conical end portion; and
(d) wherein said tip portion includes a radius or edge break where it meets the cutting edge.

\* \* \* \* \*